United States Patent [19]
Whitelaw et al.

[11] Patent Number: 6,157,416
[45] Date of Patent: Dec. 5, 2000

[54] ADVANCED PROJECTION TELEVISION SCREEN

[75] Inventors: Jeffrey G. Whitelaw, Corona; Joseph White, Tustin, both of Calif.

[73] Assignee: Mitsubishi Consumer Electronics America, Inc., Norcross, Ga.

[21] Appl. No.: 09/006,275

[22] Filed: Jan. 13, 1998

[51] Int. Cl.$^7$ .................................................... H04N 9/31
[52] U.S. Cl. ........................... 348/789; 348/787; 348/744
[58] Field of Search .................................. 348/836, 744, 348/787, 788, 794, 789; 359/460, 456, 454, 455, 457; 358/60, 64, 231; H04N 5/75, 5/64, 5/655, 9/31

[56] References Cited

U.S. PATENT DOCUMENTS 5,699,131  12/1997  Aoki et al. ............................... 348/794
5,742,358   4/1998  Iijima et al. ............................. 348/789

FOREIGN PATENT DOCUMENTS 3-295375  12/1991  Japan ................................ H04N 5/74

*Primary Examiner*—David E. Harvey
*Attorney, Agent, or Firm*—Lyon & Lyon LLP

[57] ABSTRACT

A screen assembly for a rear projection television set, including a frame portion extending about a viewing portion thereof, the viewing portion defining a lenticular screen. The frame and viewing portions may be formed as one piece, for example from injection molded plastic. The screen assembly includes a fastener for mounting the lenticular screen to a projection television set over an opening therein, and preferably for slidably mounting the lenticular screen in a focal plane thereof. The fastener may include slots extending horizontally along upper and lower regions of the frame portion for receiving slide rails attached to the television set. A set of projection tubes and a mirror mounted in the television set project a viewable image onto the lenticular screen. The lenticular screen is slidable along the focal plane between a securable closed position and an open position which provides access into the television set, for example, to focus the image on the lenticular screen without removing the screen assembly from the focal plane.

7 Claims, 4 Drawing Sheets

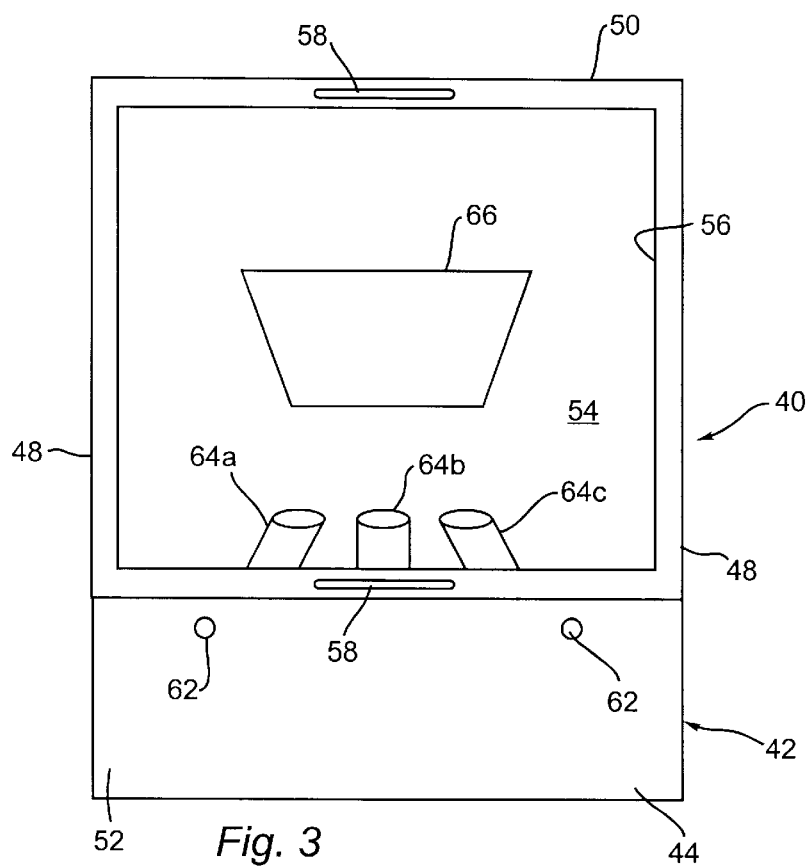
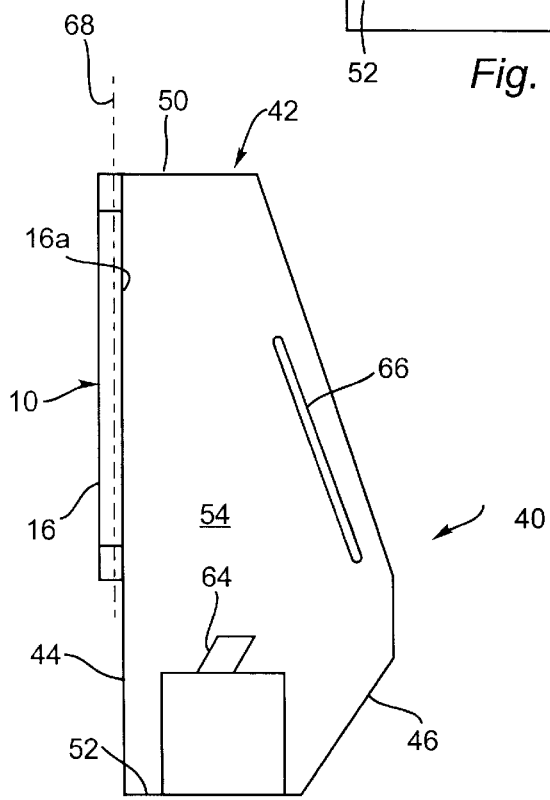
Fig. 3
Fig. 4

ADVANCED PROJECTION TELEVISION SCREEN

FIELD OF THE INVENTION

The present invention relates generally to projection television sets, and more particularly to a one piece lenticular screen and frame, and to a lenticular screen and frame that may be slidably mounted to a rear projection television set to provide access to the interior of the television set without removing the lenticular screen.

BACKGROUND

Projection television sets, particularly rear projection sets, are a popular alternative to picture tube television sets, as they provide relatively large viewable screens that cannot be efficiently produced using conventional picture tubes. Rear projection television sets typically include a casing with a set of internal projection tubes, a mirror, and electronic components for receiving and projecting an image onto a screen assembly mounted on the front of the casing.

Each projection tube projects an image, generally of a single color of light, onto the mirror in the casing which focuses the image onto an inside surface of a lenticular screen and/or fresnel lens included in the screen assembly. The lenticular screen is substantially transparent, thereby allowing the image projected onto its inside surface to be focused and observed from the outside of the television set.

The screen assembly typically includes a frame which supports the lenticular screen and facilitates attachment of the screen assembly to the casing of the television set. To produce the screen assembly, the individual components, i.e. the lenticular screen and the frame, are first made in a conventional manner. The lenticular screen is then substantially permanently attached to the frame, typically using a plurality of capture rails and fasteners. After the lenticular screen is placed over the assembled frame, the capture rails, which are provided in pairs, are placed over opposite edges of the lenticular screen, and then fasteners are driven or inserted through the capture rails and into the frame. The screen assembly may then be attached to the casing, typically after the internal components of the television set, e.g. the mirror, the projection tubes, the electronic components and/or speakers, are installed.

The casing often includes a plurality of mounting tangs attached along a perimeter of an opening in its front panel, e.g. at predetermined locations along the top and side edges of the opening. The frame includes corresponding slots along its back edges adapted to receive the tangs therein, and thereby securely attach the screen assembly to the casing. Alternatively, the frame may include a number of mounting tabs extending out from its outer edges through which screws, bolts and the like may inserted to attach the screen assembly to the casing.

One of the primary complications associated with rear projection television sets is accessing the internal components during final assembly and testing and/or when the television sets are later repaired. In particular, it is often desirable or necessary to adjust or clean the projection tubes and/or mirror, for example, to focus the images projected onto the lenticular screen.

Although a removable access panel may be provided on the back of the casing to provide access, such rear access panels may be limited in size or location due to the placement of the internal components, such as the mirror, or the electronic components. Further, when adjusting the focus of the television set, the image on the outside of the screen must be intermittently viewed to gauge progress. Rear access panels require an assembly or service person to move between the back and the front of the set to first adjust the focus and then view the image, often repeatedly.

Alternatively, service personnel may use an external mirror to facilitate viewing of the screen during adjustment. The mirror is placed at a location in front of the set and angled to allow the image on the screen to be seen in the mirror from the back of the set. This arrangement, however, may be inconvenient, particularly to field service personnel, as it may require a portable mirror and stand that has to be assembled and properly oriented prior to use. Also, the location of the television set may not provide adequate space to effectively use the portable mirror, possibly still requiring service personnel to move at least partially between the back and the sides or front of the television set.

Alternatively, the screen assembly may be detachable from the casing or may be hinged to provide access into the interior of the casing from the front. This arrangement, however, exacerbates the task of focusing, because the lenticular screen is removed from the focal plane of the television set. Thus, the screen assembly must be repeatedly opened and closed, or detached and reattached, to allow the internal components to be adjusted and then allow the image to be viewed after each adjustment.

Another complication with conventional lenticular screen assemblies is the handling of the screen assemblies during manufacturing. Because of the large size of the screens typically desired for projection televisions, the lenticular screen and frame are bulky components which are difficult and awkward to maneuver. During assembly, the lenticular screen and frame may be handled multiple times, increasing the risk of damage to the parts and resulting in slower, less efficient manufacturing.

Accordingly, there is a need for a lenticular screen assembly for projection television sets which minimizes necessary handling of the screen assembly and/or its components during manufacturing.

In addition, there is also a need for a rear projection television set which facilitates access to the interior of the set to adjust, clean or repair the internal components without removing the screen assembly.

SUMMARY OF THE INVENTION

The present invention is directed to a one piece lenticular screen and frame, and to a lenticular screen assembly that is slidably mountable onto a rear projection television set.

According to one aspect of the present invention, a one piece or unitary lenticular screen and frame for a projection television set is provided. The one piece lenticular screen and frame includes a substantially rectangular panel having an edge portion extending along a periphery of and surrounding a viewing portion of the panel. The viewing portion defines a lenticular screen for viewing a television image therethrough. Preferably, the panel is a single molded plastic body including the viewing and frame portions.

A fastener may be attached to or preferably integrally formed on the edge portion for attaching the panel to a projection television set. Preferably, the fastener includes a pair of slots extending horizontally along an interior of upper and lower regions of the frame portion. The slots are adapted to receive slide rails therein, the slide rails being attached to and extending adjacent a viewing opening of a television set for slidably retaining the lenticular screen in a focal plane thereof. The fastener may also include one or more mounting tabs extending from the frame portion for securing the panel and lenticular screen thereon in a predetermined relationship with a television set onto which the panel is slidably retained.

Thus, rather than having multiple pieces that require separate forming and assembly, the one piece lenticular screen and frame is preferably formed as a single piece, including the fastener for mounting it to a projection television set. Manufacturing time may be reduced, and the risk of damage from repeated handling and/or storage of components, especially the lenticular screen, is substantially reduced.

According to another aspect of the present invention, a rear projection television screen and a slidable lenticular screen assembly is provided. The rear projection television set includes a casing having an opening through a front panel thereof into a cavity therein. The casing defines a focal plane substantially parallel to and adjacent to the opening. An image is projected by a set of projection tubes mounted in the cavity, which is reflected off a mirror mounted in the cavity in a predetermined relationship to the set of projection tubes to focus the image in the focal plane.

A lenticular screen assembly, which preferably is a one piece lenticular screen and frame such as the molded plastic panel described above, is slidably mounted across the opening in the casing. The lenticular screen assembly and casing include slidable fasteners, preferably cooperating slots and slide rails, whereby the lenticular screen assembly may slide in the focal plane of the casing. The lenticular screen assembly may include a mounting tab, as described above, for securing the lenticular screen assembly to the casing, for example in a closed position.

Thus, the lenticular screen assembly may be secured in the closed position for normal viewing, but then may be opened if desired to access the internal components of the television set. For example, the lenticular screen assembly may be slid at least partially open to allow the projection tube and/or mirror to be adjusted, while the image being projected onto the lenticular screen may still be clearly viewed, i.e. while the lenticular screen remains substantially in the focal plane of the television set.

Accordingly, a principal object of the present invention is to provide a lenticular screen that provides access into the interior of the television set without removing the lenticular screen from the focal plane of the television set.

It is also an object of the present invention to provide a one piece lenticular screen and frame which minimizes the number of parts which must be made and handled, thereby improving manufacturing efficiency.

Other objects and features of the present invention will become apparent from consideration of the following description taken in conjunction with the accompanying drawings.

BRIEF DESCRIPTION OF THE DRAWINGS

FIG. 3 is a front view of the rear projection television set of FIG. 2 with the slidable screen assembly removed.

FIG. 4 is a cross-sectional side view of the rear projection television set of FIG. 2.

DETAILED DESCRIPTION OF THE PREFERRED EMBODIMENTS

Figure 1A:
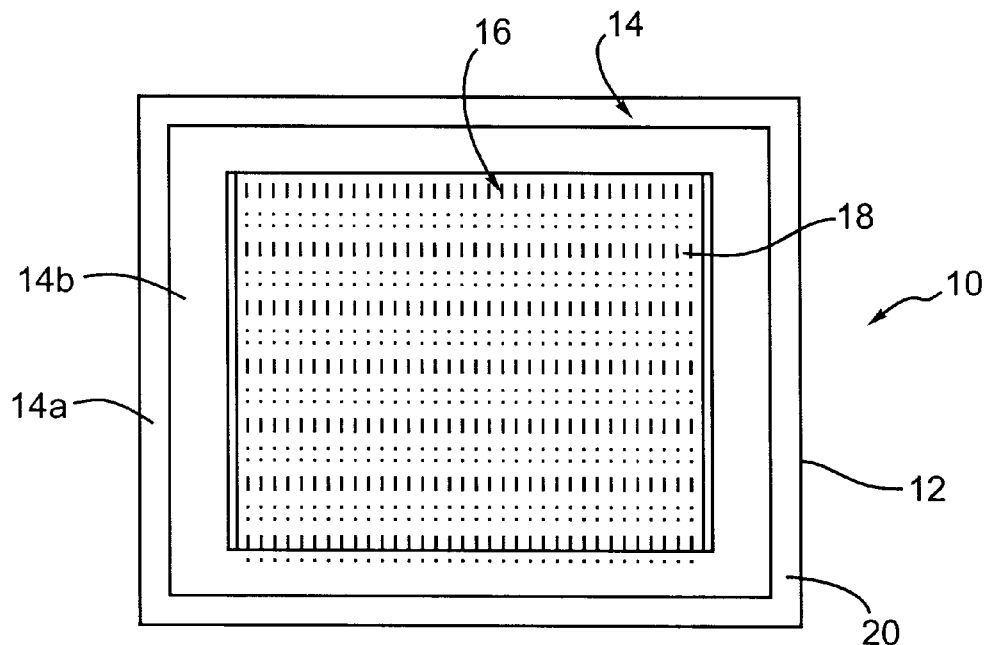
FIGS. 1A and 1B are front views of a one piece lenticular screen and frame in accordance with the present invention.
Figure 1B:
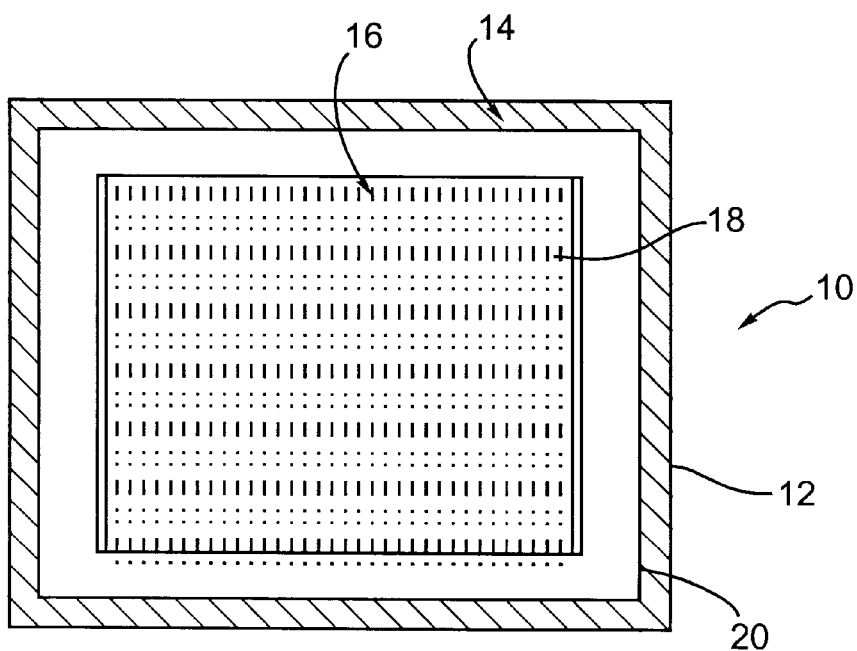

Turning now to the drawings, FIGS. 1A and 1B show a first preferred embodiment of a one piece lenticular screen and frame 10 in accordance with one aspect of the present invention. The one piece lenticular screen and frame 10 are preferably formed from a single panel 12 having an edge portion 14 extending around a viewing portion 16, thereby providing a unitary lenticular screen and frame assembly, without separately made and assembled component parts. The panel 12 is preferably formed from injection molded plastic, such as polymethyl methacralate (PMMA).

The viewing portion 16 is substantially transparent and has a size and shape adapted to project a conventional television image therethrough. The viewing portion 16 has a similar design and/or texture to the surface of conventional lenticular and/or fresnel screens, as will be familiar to those skilled in the art, and no further description regarding the viewing portion 16 will be provided herein.

The edge portion 14 has a predetermined width to provide a desired support frame and/or aesthetic border around the viewing portion 16. The edge portion 14 preferably has an applied finish thereon, for example, such as a desired color of paint. In addition, the edge portion 14 may include an embossed pattern or trim, such as a slightly raised portion 14a and a slightly recessed portion 14b, applied when the panel 12 is molded.

Figure 2:
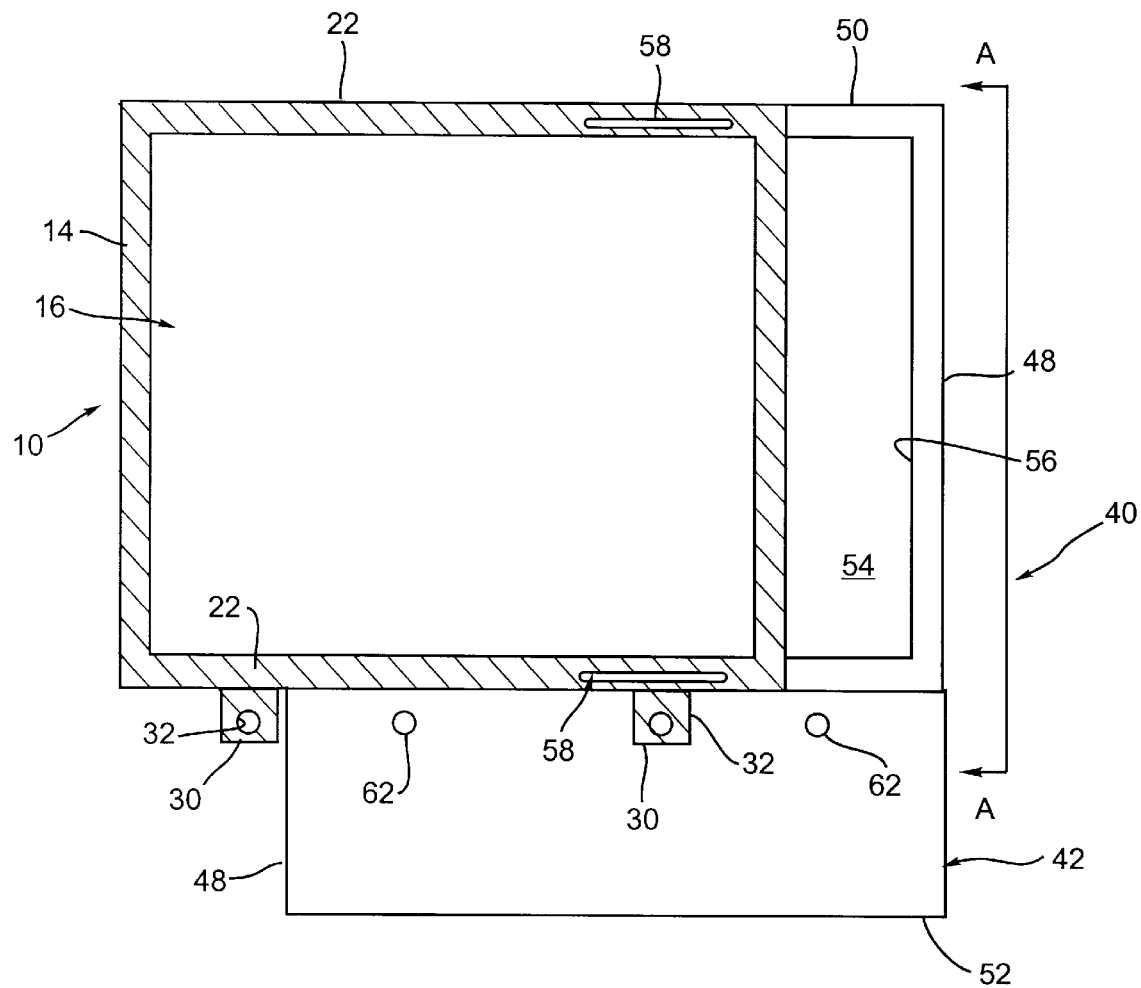
FIG. 2 is a front view of a rear projection television set in accordance with the present invention, with a slidable screen assembly in an open position.

The one piece lenticular screen and frame 10 may then be incorporated into a television set, such as the rear projection television set 40 shown in FIGS. 2–4, and described more particularly below. The one piece lenticular screen and frame 10 may include a conventional fastener (not shown) for attaching it to the television set, such as cooperating tangs and slots, punched or slotted tabs for receiving screws or bolts, and the like.

Figure 5A:
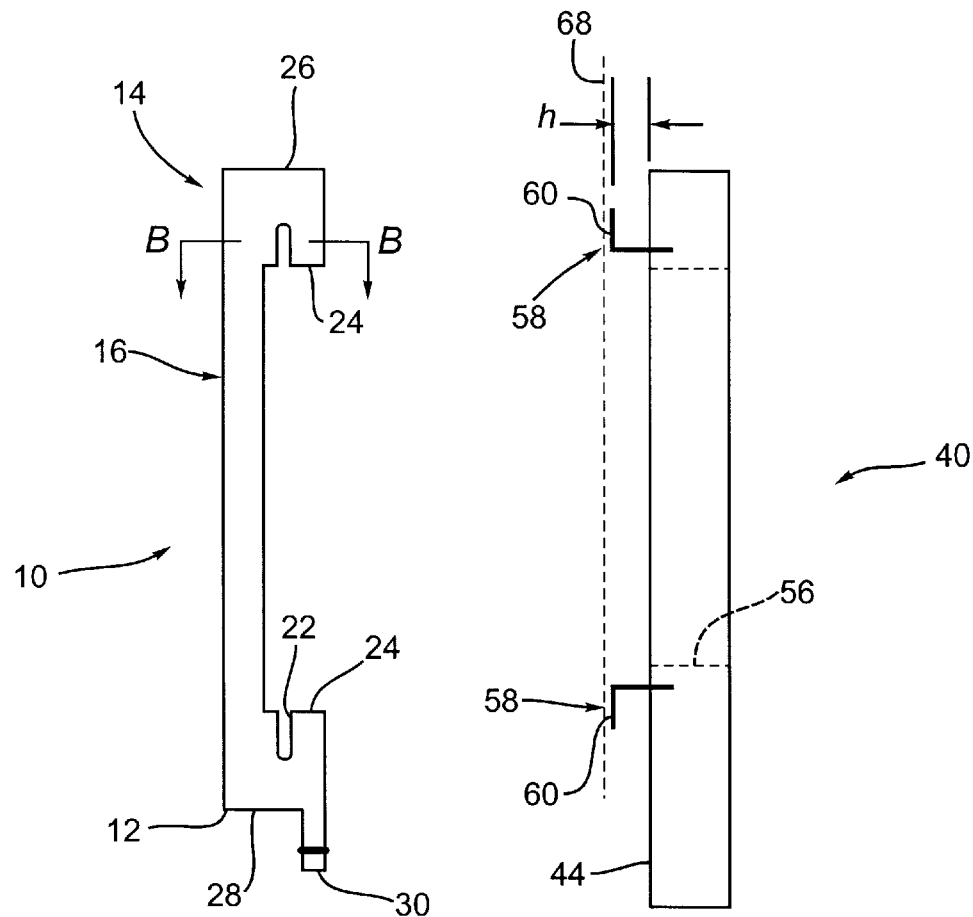
FIG. 5A is an exploded section view of a one piece lenticular screen and frame, and a television set front panel, such as that shown in FIG. 2 and taken along line A—A.
Figure 5B:
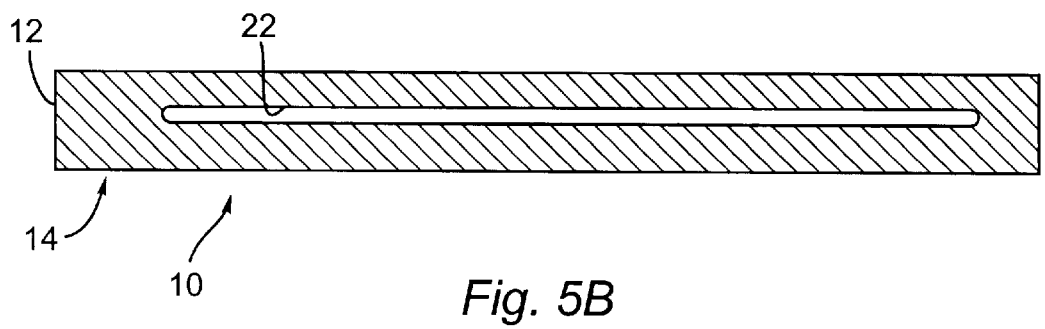
FIG. 5B is a cross-section of the one piece lenticular screen and frame of FIG. 5A, taken along line B—B.

Preferably, as shown in FIGS. 5A and 5B, the one piece lenticular screen and frame 10 includes a slot or guide track 22 for slidably mounting it to the rear projection television set 40, in accordance with another aspect of the present invention. A slot 22 preferably extends substantially horizontally along an inner edge 24 of an upper region 26 and a lower region 28 of the edge portion 14 of the panel 12. As explained below, the slots 22 are adapted to slidably receive slide rails 58 therein, thereby allowing the one piece lenticular screen and frame 10 to be slidably mounted to the television set 40.

Turning now to FIGS. 2–5, a rear projection television set 40 in accordance with the present invention is shown, which includes a slidable screen assembly, such as the one piece lenticular screen and frame 10 described above. The television set 40 includes a casing 42, having a front panel 44, a back panel 46, side panels 48, top panel 50 and a bottom panel 52, thereby defining an interior cavity 54 for containing the internal components of the television set 40. The front panel 44 has an opening 56 therethrough having a size and shape similar to the viewing portion 16 of the one piece lenticular screen and frame 10. A pair of slide rails 58 are substantially permanently fastened to the front panel 44 above and below the opening 56, and extending substantially horizontally along a predetermined length of the front panel 44.

Each slide rail 58 has a leg 60 adapted to be received in a respective slot 22, as can be seen in FIG. 5A, thereby allowing the one piece lenticular screen and frame 10 to slide horizontally in relation to the casing 42, the horizontal movement being limited by the respective lengths of the slots 22 and the rails 58. For example, as shown in FIG. 2, the one piece lenticular screen and frame 10 is shown in an open position, allowing access into the interior cavity 54.

Preferably, the one piece lenticular screen and frame 10 also include one or more mounting tabs 30, each having a hole 32 through which a screw and the like may be directed into a corresponding hole 62 in the front panel 44 to fasten the one piece lenticular screen and frame 10 in a predetermined position. Most preferably, the front panel 44 has a pair of holes 62 at a predetermined location such that when the mounting tabs 30 are aligned with the holes 62, the one piece lenticular screen and frame 10 may be fastened in a closed position (not shown), substantially preventing access into the interior cavity 54.

With particular reference to FIGS. 3 and 4, the casing 42 also contains a set of projection tubes 64 and a mirror 66 mounted inside the casing 42 in a predetermined relationship. As will be appreciated by those skilled in the art, the casing 42 also contains the necessary electronics for a projection television set, such as receiver/amplifier components, speakers and the like (not shown). The set of projection tubes 64 receives signals from the electronics and consequently projects images onto the mirror 66. The mirror 66 then reflects the images onto the inside surface 16a of the screen assembly 10.

The design and configuration of the projection tubes 64 and mirror 66 are such that a focal plane 68 is defined in which the image corresponding to each individual tube 64a, 64b or 64c is substantially in focus when a lenticular screen, such as the screen assembly 10, is placed in the focal plane 68. As shown in FIG. 5A, the slide rails 58 preferably have a predetermined height h such that when the one piece lenticular screen and frame 10 are mounted on the slide rails 58, the viewing portion 16 lies substantially in the focal plane 68. The width of the slots 22 corresponds substantially with the thickness of the legs 60 on the slide rails 58 to provide a snug but slidable fit between the slots 22 and rails 58, thereby preventing substantial transverse movement of the viewing portion 16 out of the focal plane 68. Optionally, adjustable spacers (not shown) may be provided on the slide rails 58 or in the slots 22 to adjust the height h and facilitate focusing of the image on the viewing portion 16.

When the one piece lenticular screen and frame 10 is secured in a closed position (not shown), the complete image from the projection tubes 64 may be clearly observed from the outside of the viewing portion 16, for example during normal use of the television set 40. During factory adjustment, service and/or repair, fasteners (not shown) attached through the mounting tabs 30 may be removed, and the one piece lenticular screen and frame 10 may be slid to the open position, as shown in FIG. 2. The interior cavity 54 may then accessed, for example to move the projection tubes 64 to adjust the focus of the image on the viewing portion 16, to clean the mirror 66, etc.

Thus, with a lenticular screen and rear projection television set in accordance with the present invention, the focus may be adjusted while continuously and conveniently monitoring the image on the screen. There is no need to use temporary mirrors or to move repeatedly between the front and back of the television set to focus the image.

Alternatively, the screen assembly 10 may be pivotally mounted to the casing 42. For example, a pivotable mount (not shown) may be attached in one corner of the screen assembly and the casing, allowing the screen assembly to move radially about the mount while remaining substantially in the focal plane of the television set.

Thus, the screen assembly may be closed and secured for normal viewing, for example using the mounting tabs described above. When access to the interior cavity is needed, the fasteners in the mounting tabs may be removed, and the screen assembly rotated about the pivotable mount while it still remains substantially in the focal plane. The internal components may then be accessed while still viewing the image on the screen. The pivotable screen assembly allows an access opening to be created that is as large as needed, while providing at least a partial viewable image to aid in focusing the television set.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A rear projection television set, comprising:
   a casing having an opening through a front panel thereof into a cavity therein, and defining a focal plane substantially parallel to and adjacent to said opening;
   a set of projection tubes mounted in said cavity for projecting an image;
   a mirror mounted in said cavity in a predetermined relationship to said set of projection tubes such that the image projected from said set of projection tubes is reflected thereon and focused in said focal plane; and
   a lenticular screen slidably mounted to said casing across said opening, said lenticular screen being slidable in said focal plane between a closed position covering said opening, and an open position for accessing said cavity while maintaining an image in focus on said lenticular screen.

2. The rear projection television set of claim 1, wherein said lenticular screen is substantially permanently attached to said casing.

3. The rear projection television set of claim 1, further comprising a frame extending around a periphery of said lenticular screen, said frame and said casing including one or more cooperating slots and slide rails, whereby said lenticular screen may slide in said focal plane.

4. The rear projection television set of claim 3, wherein said frame includes a mounting tab for securing said lenticular screen to said casing in said closed position.

5. The rear projection television set of claim 3, wherein said lenticular screen includes a peripheral portion integrally formed along said lenticular screen, said peripheral portion comprising said frame.

6. The rear projection television set of claim 1, wherein said lenticular screen comprises a molded plastic panel having an edge portion and a viewing portion.

7. The rear projection television set of claim 6, wherein said edge portion includes a plurality of slots and said casing includes a corresponding plurality of slide rails adapted to be received in said slots for slidably attaching said lenticular screen to said hollow casing in said focal plane.

* * * * *